Patented June 30, 1942

2,288,282

UNITED STATES PATENT OFFICE 2,288,282

PROCESS FOR PRODUCING POLY-HYDROXYARYLSULPHONES

Johann Huismann, Leverkusen-Wiesdorf, Germany, assignor to General Aniline & Film Corporation, New York, N. Y., a corporation of Delaware No Drawing. Application February 6, 1941, Serial No. 377,659. In Germany February 12, 1940

2 Claims. (Cl. 260—607)

The present invention relates to a process for producing polyhydroxyarylsulphones of the general formula:

[R—$SO_2$—$R_1$—($SO_2$—$R_2$)$_m$]—(OH)$_n$ wherein R and $R_2$ stand for radicles of the benzene series, $R_1$ stands for a radicle selected from the benzene and diphenyl series, $m$ means one of the numbers zero and one and $n$ means one of the numbers two, three and four. The present process consists in subjecting polyhalogenarylsulphones of the general formula:

[R—$SO_2$—$R_1$—($SO_2$—$R_2$)$_m$]—hal$_n$ wherein R, $R_1$ and $R_2$ and $m$ and $n$ have the aforesaid signification and the halogen atoms stand in ortho and para positions to a $SO_2$ group, to the action of a caustic alkali in the heat.

The reaction is advantageously carried out in an aqueous or aqueous-alcoholic solution in a closed vessel. Halogen atoms standing in meta-position to a sulphone group remain unchanged. Of course other substituents may be present in the molecule of the initial product.

The present process yields the polyhydroxy-compounds in an almost theoretical yield without the formation of by-products, a fact which is surprising in view of the well known difficulties of converting chlorobenzene into phenol.

The polyhydroxy arylsulphones, which are obtainable according to my present process with an excellent yield, are valuable intermediates for the production of dyestuffs, pharmaceutical products and tanning agents. They are for the most part substances hitherto unknown.

In order to further illustrate my invention the following examples are given the parts being by weight and all temperatures in degrees centigrade.

Example 1

To a solution of 500 parts of potassium hydroxide in about 50 parts of water and 1200 parts of methyl alcohol there are added 287 parts of 2'-4-dichlorodiphenylsulphone melting at 101° C., obtainable for instance by condensing 2-chlorobenzenesulphochloride with chlorobenzene in the presence of ferric chloride. The mixture is heated for about 12 hours at 160 to 165° C. in a closed vessel provided with a stirrer. The reaction mixture is allowed to cool whereupon the potassium chloride which has been precipitated in almost theoretical amount is removed by filtration from the alcoholic aqueous solution. The filtrate is evaporated until crystallization begins. The potassium salt of 2'-4-dihydroxydiphenylsulphone is obtained in an excellent yield as a white powder which is easily soluble in water. By pouring the aqueous solution into an excess of dilute hydrochloric acid, the new 2'-4-dihydroxydiphenylsulphone of the formula:

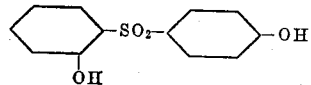

and having a melting point of 184–185° C. is formed.

Example 2

A mixture of a solution of 600 parts of potassium hydroxide in about 3400 parts of water and of 287 parts of 4.4'-dichlorodiphenylsulphone is heated for about 10 hours at 210 to 220° C. in a closed vessel provided with a stirrer. The light yellow solution of the potassium salt thus obtained is separated by filtration from the potassium chloride formed and then poured into an excess of dilute hydrochloric acid. The 4.4'-dihydroxydiphenylsulphone of the formula:

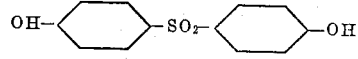

is obtained in almost theoretical yield as a white precipitate which melts in a pure state at 245 to 246° C.

Example 3

A mixture of a solution of 448 parts of potassium hydroxide in about 80 parts of water and 1000 parts of methyl alcohol and of 287 parts of 2.4-dichlorodiphenylsulphone, obtainable for instance by decomposing 2.4-dichlorobenzene-1-sulphochloride with benzene in the presence of ferric chloride, is heated for about 12 hours in a closed vessel provided with a stirrer. The reaction product is isolated as described in the foregoing examples. The new 2.4-dihydroxydiphenylsulphone of the formula:

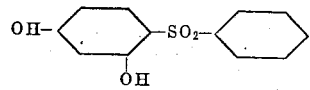

is obtained in an excellent yield as a white precipitate, which melts in a pure state at 115 to 116° C.

In a similar manner 2'.4'-dichloro-2.4-dimethyldiphenylsulphone having a melting point of 137–138° C. may be converted with an excellent yield into 2',4'-dihydroxy-2.4-dimethyldiphenyl-sulphone of the formula:

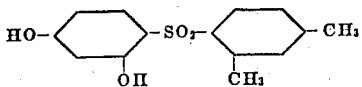

melting in a pure state at 114 to 115° C.

Example 4

A mixture of 322 parts of 2',4.5'-trichlorodiphenylsulphone having a melting point of 156 to 157° C., obtainable for instance by decomposing 2.5-dichlorobenzenesulphochloride with chlorobenzene in the presence of ferric chloride, and of a solution of 448 parts of potassium hydroxide in about 1000 parts of methyl alcohol and 60 parts of water is heated for about 12 hours at 155 to 160° C. in a closed vessel provided with a stirrer. The reaction product is isolated as described in the foregoing examples. The formed new 5'-chloro-2'.4-dihydroxy-diphenylsulphone of the formula:

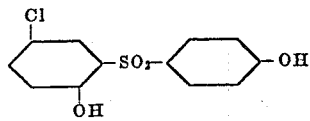

melts in a pure state at 189 to 190° C.

In a similar manner 2'.3.4-trichlorodiphenylsulphone of 133 to 134° melting point yields the new 3-chloro-2'.4-dihydroxydiphenylsulphone of the formula:

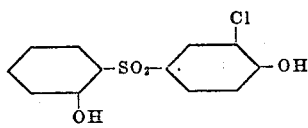

and 3.'4.4'-trichlorodiphenylsulphone having a melting point of 118° C., the new 3'-chloro-4.4'-dihydroxydiphenylsulphone of the formula:

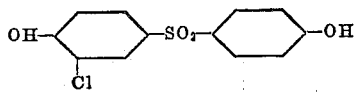

having a melting point of 206–207° C.

Example 5

A mixture of a solution of 448 parts of potassium hydroxide in about 60 parts of water and 1000 parts of methyl alcohol and of 455 parts of 1.3-dimethyl-4.6-bis-(2'-chloro-phenylsulphone)-benzene having a melting point of 234° C. obtainable by decomposing two molecular proportions of 2-chlorobenzenesulphochloride with one molecular proportion of 1.3-dimethylbenzene in the presence of ferric chloride, is heated for about 12 hours at 150 to 155° C. in a closed vessel provided with a stirrer. The new reaction product of the formula:

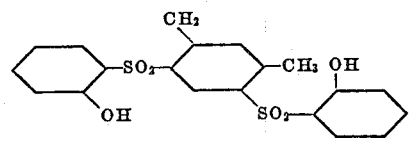

is isolated in accordance with the method described in the foregoing examples. It is obtained immediately in a pure state as a white precipitate in almost theoretical yield and has a melting point of 199.5 to 200.5° C.

Example 6

A mixture of 455 parts of 1.3-dimethyl-4.6-bis (4'-chlorophenylsulphone) benzene, obtainable by condensing two molecular proportions of 4-chlorobenzenesulphochloride with one molecular proportion of 1.3-dimethylbenzene in the presence of ferric chloride acting as catalyst, and of a solution of 560 parts of potassium hydroxide in about 7000 parts of water is heated in a closed vessel for about 10 hours at 210 to 220° C.

The new dihydroxy compound of the formula:

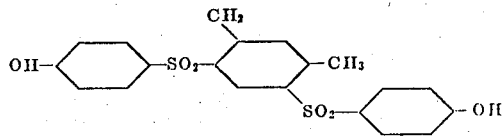

is obtained in almost theoretical yield as a white precipitate which melts at 291 to 292° C.

Example 7

A mixture of a solution of 896 parts of potassium hydroxide in about 120 parts of water and 2000 parts of methyl alcohol and of 524 parts of a condensation product of the formula:

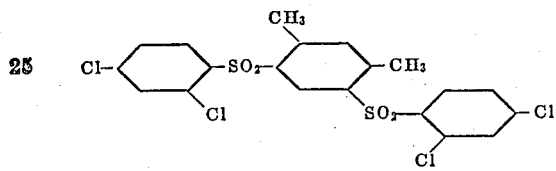

having a melting point of 185 to 186° C., obtainable by decomposing two molecular proportions of 2.4-dichlorobenzenesulphochloride with one molecular proportion of 1.3-dimethylbenzene in the presence of ferric chloride is heated for about 12 hours at 150 to 155° C. in a closed vessel. The new reaction product which is obtained with an almost theoretical yield may be purified by recrystallization from dilute alcohol. It corresponds to the formula:

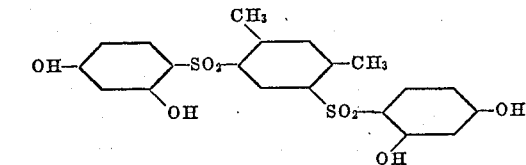

and melts at 238 to 239° C.

Example 8

A mixture of a solution of 448 parts of potassium hydroxide in about 60 parts of water and 1000 parts of methyl alcohol and 503 parts of diphenyl-4.4'-bis(4''-chlorophenylsulphone) having a melting point of 276 to 277° C., obtainable by condensing two molecular proportions of 4-chlorobenzenesulphochloride with one molecular proportion of diphenyl in the presence of ferric chloride, is heated for about 12 hours in a closed vessel at 150 to 155° C. The reaction product is isolated as described in the foregoing examples. The formed new bis-4-hydroxyphenyl-diphenyl-disulphone of the formula:

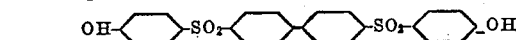

melts when recrystallized from alcohol at 227 to 228° C.

I claim:

1. Process for producing polyhydroxyarylsulphones of the general formula:

wherein R and $R_2$ stand for radicles of the benzene series, $R_1$ stands for a radicle selected from the benzene and diphenyl series, $m$ means one of the numbers zero and one and $n$ means one of the numbers two, three and four, which process consists in subjecting polyhalogenarylsulphones of the general formula:

$$[R\!-\!SO_2\!-\!R_1\!-\!(SO_2\!-\!R_2)_m]\!-\!hal_n$$

wherein R, $R_1$ and $R_2$ and $m$ and $n$ have the aforesaid signification and the halogen atoms stand in ortho and para positions to a $SO_2$ group, to the action of a caustic alkali in the heat.

2. Process for producing polyhydroxyarylsulphones of the general formula:

$$[R\!-\!SO_2\!-\!R_1\!-\!(SO_2\!-\!R_2)_m]\!-\!(OH)_n$$

wherein R and $R_2$ stand for radicles of the benzene series, $R_1$ stands for a radicle selected from the benzene and diphenyl series, $m$ means one of the numbers zero and one and $n$ means one of the numbers two, three and four, which process consists in subjecting polyhalogenarylsulphones of the general formula:

$$[R\!-\!SO_2\!-\!R_1\!-\!(SO_2\!-\!R_2)_m]\!-\!hal_n$$

wherein R, $R_1$ and $R_2$ and $m$ and $n$ have the aforesaid signification and the halogen atoms stand in ortho and para positions to a $SO_2$ group, to the action of a caustic alkali solution in the heat in a closed vessel.

JOHANN HUISMANN.